United States Patent [19]

Prasad

[11] Patent Number: 5,185,014

[45] Date of Patent: Feb. 9, 1993

[54] MEMBRANE OXYGEN PROCESS AND SYSTEM

[75] Inventor: Ravi Prasad, East Amherst, N.Y.

[73] Assignee: Praxair Technology, Inc., Danbury, Conn.

[21] Appl. No.: 787,953

[22] Filed: Nov. 5, 1991

[51] Int. Cl.⁵ .................. B01D 53/22; B01D 63/04
[52] U.S. Cl. .......................... 55/16; 55/68; 55/158
[58] Field of Search .................. 55/16, 68, 158

[56] References Cited

U.S. PATENT DOCUMENTS

| | | | |
|---|---|---|---|
| 1,496,757 | 6/1924 | Lewis et al. | 55/16 |
| 3,144,313 | 8/1964 | Pfefferle | 55/16 |
| 3,241,293 | 3/1966 | Pfefferle | 55/16 |
| 3,250,080 | 5/1966 | Gafwin | 55/16 X |
| 3,339,341 | 9/1967 | Maxwell et al. | 55/158 X |
| 3,674,435 | 7/1972 | VanLuik, Jr. et al. | 55/16 X |
| 3,735,558 | 5/1973 | Skarstrom et al. | 55/16 |
| 3,735,559 | 5/1973 | Salemme | 55/16 |
| 3,930,813 | 1/1976 | Gessner | 55/16 |
| 3,930,814 | 1/1976 | Gessner | 55/16 |
| 3,979,190 | 9/1976 | Hedman | 55/16 X |
| 4,119,417 | 10/1978 | Heki et al. | 55/158 |
| 4,130,403 | 12/1978 | Cooley et al. | 55/16 |
| 4,140,499 | 2/1979 | Ozaki et al. | 55/16 X |
| 4,264,338 | 4/1981 | Null | 55/16 |
| 4,497,640 | 2/1985 | Fournié et al. | 55/16 |
| 4,718,921 | 1/1988 | Makino et al. | 55/16 |
| 4,857,081 | 8/1989 | Taylor | 55/16 |
| 4,931,070 | 6/1990 | Prasad | 55/158 X |
| 4,961,759 | 10/1990 | Taylor | 55/16 |
| 4,964,886 | 10/1990 | Brugerolle et al. | 55/16 |
| 5,034,025 | 7/1991 | Overmann, III | 55/16 |
| 5,084,073 | 1/1992 | Prasad | 55/16 |

OTHER PUBLICATIONS

Gas Separation by Permeation, Part 1. Calculation Methods and Parametric Analysis C. Y. Pan and H. W. Habgood Alberta Research Council, 11315-87th Avenue, Edmonton, Alberta T6G 2C2, The Canadian Journal of Chemical Engineering, vol. 56, Apr., 1978, pp. 197-209.

Primary Examiner—Robert Spitzer
Attorney, Agent, or Firm—Alvin H. Fritschler

[57] ABSTRACT

A two stage membrane system is used for the production of oxygen from air. All or a portion of the feed air is passed to the permeate side of the second stage membrane as purge gas. The gas withdrawn from the permeate side of the second stage membrane is passed as feed gas to the first stage membrane, from which product oxygen is recovered.

18 Claims, 3 Drawing Sheets

MEMBRANE OXYGEN PROCESS AND SYSTEM

BACKGROUND OF THE INVENTION

1. Field of the Invention

The invention relates to membrane gas separations. More particularly, it relates to the use of membranes for the production of oxygen, or oxygen enriched air, from air.

2. Description of the Prior Art

Oxygen gas is a valuable commodity product that is widely used throughout industry. The conventional means for producing oxygen is by the cryogenic distillation of air. For large-scale production, cyrogenic distillation is very efficient and produces a high purity oxygen product. For smaller volume applications, particularly where the costs of distributing high purity oxygen gas or liquid to a point of use are high, however, various "on-site" oxygen production systems may be highly desirable and preferable to cryogenic distillation. In recent years, pressure swing adsorption (PSA) processes and systems have been developed to serve such applications. Thus, on-site PSA systems can be developed for the production of relatively large volumes of oxygen product, and desirably, can be scaled down to a small size for lower volume applications. For example, very small PSA systems are used to generate oxygen for hospital and home-care applications, as in the generation and supply of oxygen for individuals suffering from emphysema and the like.

There are a variety of other applications, particularly for the enhancement of combustion processes, where low purity oxygen, or even oxygen enriched air, is satisfactory, or even preferred, on an overall evaluation basis. For such identified applications, such low purity oxygen or oxygen enriched air is usually provided by diluting high purity oxygen produced in cryogenic distillation systems with ambient air.

As a result of such experiences, the art has come to appreciate the significant number of actual and potential uses for oxygen gas having varying degrees of purity level and available in widely differing volume apparatus. In light of such appreciation, the art has recently developed a considerable interest in the use of membrane permeation technology for the production of oxygen and nitrogen from air. Membrane permeation processes are attractive because of their inherent simplicity, including the absence of any requirement for moving mechanical equipment other than that needed to compress feed air for passage to the membrane system. In order to achieve Practical oxygen permeation rates for commercial applications, the permeable membrane must be very thin, possess a large surface area, and be free of pinholes and other defects that would negate the selectivity of gas separation obtainable by the membrane. These requirements have been satisfied to a considerable extent by the development of asymmetric and composite-type hollow fiber membranes. By proper disposition and assembly of hollow fibers into membrane bundles, it is possible to produce membrane modules suitable for the passage of high pressure feed air along either the shell side or the bore side of the fibers. The feed air becomes progressively leaner in its more highly permeable components as it passes on one side of the membrane module, and progressively richer in the less permeable components, ultimately being withdrawn from the membrane module as the non-permeate or "retentate" stream. The permeate gas, i.e. the gas that has passed through the thin separation region of the membrane, flows along the opposite side, either bore side or shell side, of the fibers and is separately withdrawn from the membrane module.

Various mathematical models have been developed to describe the operating characteristics of membrane permeation modules, as for example as shown by C. Y. Pan and H. W. Habgood, in Can. J. Chem., Eng. 56 (1978) pp. 197-205. Most hollow fiber membrane modules are found to operate according to the "crossflow" model, wherein the composition of the local permeate, on the low side of the skin or separation layer portion of the membrane, is considered not to mix with the bulk permeate gas stream. According to this model, the direction of the permeate flow is inconsequential, and the permeate stream can be withdrawn from either end of the module. Since no beneficial effect is seen in employing a permeate purge stream under such circumstances, most permeators are designed as three-port devices with no provision for the addition of purge gas thereto. The three ports employed correspond to the feed gas input, the retentate output, and the permeate output.

If a composite hollow fiber membrane is formed with a thin separation layer of membrane material coated over a relatively high porosity substrate, it is possible to produce a permeator that exhibits a high degree of radial mixing on both the permeate and non-permeate sides of the membrane. By winding such composite hollow fibers in an ordered helical manner, such that all fibers are of the same length, the membrane module can be made to perform more favorably than would be predicted by the crossflow model. In such cases, the modules tend to follow the desirable "cocurrent" or the "countercurrent" permeation models, depending on the direction of permeate gas flow relative to the flow of retentate gas. In most cases, the countercurrent flow pattern yields the best results for practical commercial operations. Desirable countercurrent modules can be constructed with four ports, so that a low pressure purge gas stream can be introduced to said modules on the permeate side thereof.

In general, organic polymers suitable for use in the formation of the separation layer of composite membranes are more permeable to oxygen than to nitrogen. Thus, when so used in a membrane module for air separation purposes, such separation layer materials will cause the permeate to become enriched in oxygen, as the more readily permeable component of feed air, while the retentate becomes enriched in nitrogen. The degree of air separation achieved is related to the ratio of the permeability coefficients of oxygen and nitrogen for the separation layer material, i.e. the separation factor. Typical separation factors of commercially feasible polymeric materials for air separation range generally from 3 to 10. As is known in the art, most polymers having high selectively, i.e. high separation factors, also tend to have relatively low production or permeability characteristics.

While membrane permeation processes have been considered for air separation applications for either oxygen or nitrogen production, it is much easier to devise an economically attractive process for producing nitrogen than for oxygen production. As air is passed at high pressure along a membrane surface, more oxygen tends to permeate through the membrane material than nitrogen. Thus, the feed air stream becomes leaner in oxygen, and richer in nitrogen, as it passes along the membrane from the feed input port to the retentate output port. By increasing the length of the flow passage, or by reducing the feed air flow rate, the degree of nitrogen product purification achieved can be increased. In this manner, most of the oxygen can be removed in a single step process to produce a relatively pure nitrogen product. The permeate is thereby enriched in oxygen, but, since a portion of the nitrogen in the feed air also permeates through the membrane, the purity of the permeate gas is necessarily limited. Furthermore, for a given flow rate, the longer the membrane fiber is made, the more nitrogen is permeated along with oxygen, and the lower the oxygen purity of the permeate gas obtained. The highest oxygen purity is achieved when the so-called stage cut is very small, so that nearly pure air exists along the retentate side of the membrane. Operations at very low stage cuts, however, are very inefficient. As a result, practical single-stage membrane processes for oxygen production are severely limited with respect to the oxygen purity levels that can be produced.

Permeable membrane air separation processes have been devised for producing oxygen at higher purity levels by the use of multiple membrane stages. One such membrane process for increasing oxygen purity is by the use of a cascade process. In this approach, the permeate from an initial membrane stage, which has been enriched in oxygen, is recompressed and passed through a second membrane stage, whereby the permeate is further enriched in oxygen. The permeate from the second stage can, if desired, be passed to additional stages, ultimately leading to the recovery of a high purity oxygen product. Such cascade processes, however, require that the permeate streams be recompressed before use in subsequent stages. This requires the use of multiple compressors, which must be synchronously controlled.

Another approach for increasing oxygen purity is by employing two membrane permeators in series, and recycling the permeate gas of the second stage to the feed end of the first membrane stage. The oxygen concentration of the product gas recovered as permeate from the first stage can be controlled by adjusting the overall stage cut of the system. This approach is capable of producing relatively high purity oxygen provided that the recycle rate of permeate from the second stage is sufficiently high. At a high recycle rate, the recycle stream is rich in oxygen compared to air. This recycle stream is blended with input feed air, increasing its oxygen concentration and thus raising the oxygen concentration of the permeate recovered from the first stage membrane permeator.

In this recycle process using two membranes in series, the high pressure retentate from the first stage serves as feed gas for the second stage. The permeate from the second stage can be oxygen rich, depending on the stage cut, and this stream is blended with the feed air to form the feed input to the first stage. The oxygen concentration of the recycled stream is greater than 21%, i.e. air. The first stage permeate is recovered as product gas.

The operating characteristics of this recycle process depend on the separation factor of the membrane, the feed/permeate pressure ratio employed, the relative membrane surface areas of the two stages, and the overall stage cut. It has been found that the maximum oxygen purity obtainable increases substantially as more of the membrane area is allocated to the second stage, at fixed separation factor and pressure ratio conditions. The oxygen concentration varies with the stage cut, and it peaks at stage cuts in the range of 0–21% corresponding to the oxygen concentration in air. In the vicinity of the peak, the stage cut can be varied appreciably without greatly altering the product oxygen concentration. Thus, there is a wide range of possible operating conditions for this process. In fact, if more than about 70% of the surface area is allocated to the second stage, the process can yield product oxygen concentrations that are above the single stage theoretical limit, e.g. about 50% oxygen by volume at a separation factor of 6.

In spite of the advantages of the two stage recycle process, it suffers in efficiency, primarily because of the blending of gas streams of different composition at the feed point. This blending generates entropy that degrades the overall process efficiency. Thus, there remains in the art a need for an improved, more efficient membrane oxygen process and system.

It is an object of the invention to provide an improved membrane gas separation process and system.

It is another object of the invention to provide an improved membrane process and system for the production of oxygen, or oxygen enriched air, from air.

It is a further object of the invention to provide a more efficient membrane oxygen production process and system.

With these and further objects in mind, the invention is hereinafter described in detail, the novel features thereof being particularly pointed out in the appended claims.

SUMMARY OF THE INVENTION

Oxygen is produced from feed air by employing two separate membrane permeators in series, with the permeate gas from the second stage being combined with additional amounts of feed air and, after compression, being used as feed gas to the first stage membrane permeator.

BRIEF DESCRIPTION OF THE DRAWINGS

The invention is hereinafter described in detail with reference to the accompanying drawings in which.

DETAILED DESCRIPTION OF THE INVENTION

The objects of the invention are accomplished by using all, or a portion, of the feed air to countercurrently purge the permeate side of the second stage of a two-stage membrane oxygen product system. The purge stream increases the oxygen partial pressure driving force across the second stage membrane, thus increasing the amount of oxygen permeating the second stage. As a result, greater oxygen enrichment of the feed to the first stage is achieved, and hence a greater oxygen concentration is achieved in the oxygen product gas. By achieving essentially the same composition for the local permeate gas at the retentate discharge end of the second stage as feed air, the mixing losses inherent in the conventional two stage recycle process can be eliminated. As a result, the process and system of the invention is more efficient, and is able to achieve greater oxygen purity levels and lower compression power requirements than is achieved in the conventional approach.

Figure 1:
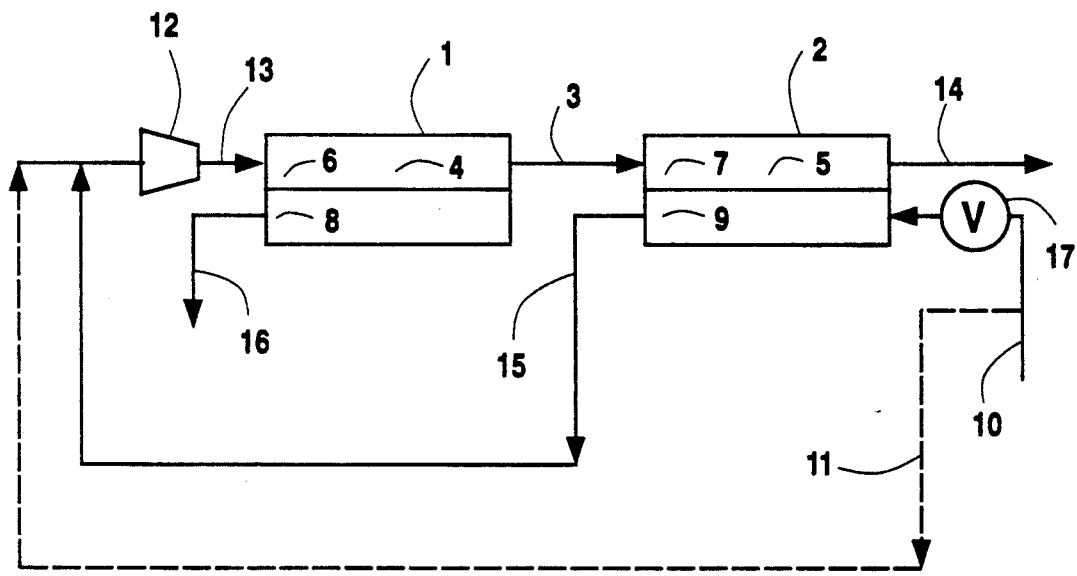
FIG. 1 is a schematic flow diagram of the two stage membrane process and system of the invention.

With reference to FIG. 1 of the drawing, a two stage membrane system is employed, with first stage membrane module 1 being connected to second stage membrane module 2 by line 3, so that high pressure permeate gas from membrane module 1 serves as feed gas for membrane module 2. Both membrane stages comprise bundles of hollow fiber membranes, i.e. membranes 4 and 5, respectively, that effectively divide the volume of each membrane module into two regions, i.e. high pressure regions 6 and 7 and low pressure regions 8 and 9. Second stage membrane module 2 is designed and fabricated so that its operation tends to follow the countercurrent permeation model. The air component concentrations at the surfaces of membrane 5, which control permeation, are thus close to the concentration in the bulk gas spaces at that position of membrane 2. Under such circumstances, the use of feed air purge in accordance with the invention will have its maximum benefit. It is desirable, but not necessary, that first stage membrane module 1 behave in a similar manner.

A portion or all of the feed air to the system is introduced through line 10 to second stage membrane module 2 on low pressure purge side 9, where it serves as a purge stream for the permeate gas in this second stage. The portion of feed air not so introduced into membrane module 2 is passed through line 11 to the upstream side of feed air compressor 12 for compression and passage in line 13 to high pressure region 6 of membrane module 1. This is desirable so as to minimize the pressure drop on the permeate side of membrane 5. Composition gradients will be established in both high pressure volume 7 and low pressure volume 9 along the length of membrane 5, in accordance with the countercurrent model. Under normal operating conditions, the high pressure retentate, which is discharged from membrane module 2 through line 14, will be rich in nitrogen. The low pressure permeate from membrane module 2 will be enriched in oxygen, compared to air. This second stage permeate is passed through line 15 as a recycle stream, blended with the portion of feed air optionally in line 11, and passed to the suction of feed end compressor 12 for compression to the desired high pressure level.

Upon passage of feed gas from line 13 to first stage membrane module, a composition gradient is also established in high pressure space 6 so that retentate gas entering line 3 is depleted in oxygen compared to the composition of feed air. The composition gradient that is likewise established in low pressure space 8 is such that the oxygen concentration is highest at the permeate end of the membrane module 1 where product oxygen is withdrawn through line 16. While membrane module 1 preferably follows the countercurrent model, this is not essential, and crossflow behavior could be tolerated therein. It should also be noted that membrane module 1 can be a 3-port permeator since no purge gas is typically employed therein, while membrane module 2 will, of course, be a 4-port permeator with all or a portion of the feed air for the system being used as purge gas therein. Optional blower/compressor means 17 can be employed to provide feed air to low pressure space 9 at the desired permeate side pressure. It should be noted that, when all of the feed air is thus used as purge gas for second stage membrane module 2, and ideally with no pressure drop through said second stage, there is no blending of gas streams outside of the membrane stages in the practice of the invention.

The capabilities of the improved, feed-refluxed, two-stage system of the invention and of the conventional two stage recycle system referred to above were compared on the basis of the permeation module of the second stage following the countercurrent model in both cases. The differences in result are thus attributable to processing differences and not due to differences in membrane module design.

The concentration of oxygen in the product stream was computed as a function of the overall stage cut, for fixed values of the membrane separation factor and for fixed values of high and low pressures. The fraction of the total membrane area located in the first stage, with the remainder being allocated to the second stage, was used as a parameter in such determinations.

In addition to determining product oxygen concentration at a given stage cut, the "area factor" and the "compressor factor" were determined for each operating point. The "stage cut" is the ratio of the permeate flow to the feed flow. If all of the feed gas were to permeate the membrane, i.e. a stage cut of 100%, there would be no gas separation achieved. It is apparent that the highest concentrations of oxygen in the permeate gas are obtained when the stage cut is very small. The "area factor" is the total membrane area required to produce a fixed flow rate of "equivalent pure" oxygen in the product stream, with "equivalent pure" oxygen being the amount of pure oxygen that would be required to produce the product when blended with free air. The "compressor factor" is the ratio of the flow rate of gas that must be compressed to the flow rate of equivalent pure oxygen. The so-called "cost factor" is a linear combination of area and compressor factors that approximately represents the relative cost of operating the membrane process. It is obviously desirable that all of these factors be as low as possible, but, since the surface area and compressor factors may vary in opposite directions, the most satisfactory operations are achieved by minimizing the cost factor.

Figure 2:
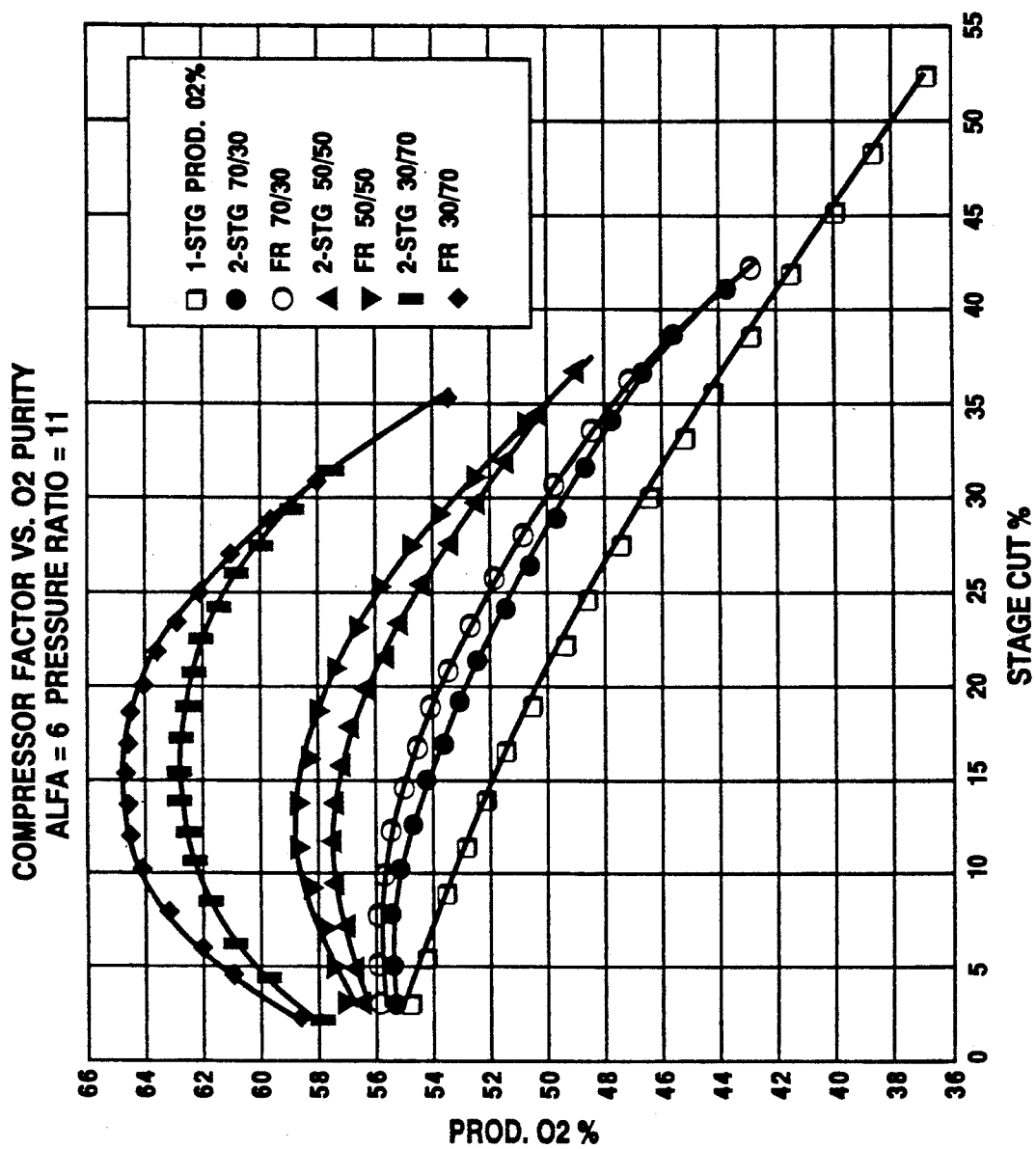
FIG. 2 is a plot of oxygen purity vs. stage cut for various surface area allocations.

FIG. 2 of the drawings is a plot of product oxygen purity against the stage cut, for several different surface area allocations between the first and second stage membranes, i.e. 100, 70, 50 and 30% of the total area in the first stage. A separation factor of 6 was employed, together with a pressure ratio of feed/permeate of 11. Results are shown for the conventional two stage system referred to above and the feed-refluxed (FR) system of the invention. The curves shown in FIG. 2 appear in grouped pairs at the different surface area distributions, together with the bottom curve that represents a single stage system without recycling. As will be seen, the upper curve of each pair represents the FR system, and the lower curve of each pair represents the conventional two stage system. As shown in FIG. 2, the FR system of the invention produces oxygen product substantially higher in purity than that produced in a single stage system. In addition, the oxygen purity obtained in the FR system is greater than that of the conventional two stage system over a wide range of stage cuts from about 2% to about 30%, particularly in the stage cut range of from about 5% to about 25%.

When the area factor was determined and plotted against product oxygen purities for each of the area distributions referred to above, and for the single stage system, at the same separation factor and pressure ratio conditions indicated above, it was found that the area factors for the two stage systems were higher than for a single stage system at any given oxygen product purity level. The area factor was found to increase substantially as more of the total membrane surface area is allocated to the second stage. This would be expected since, in said two stage systems, the second stage is not an oxygen producing, but a recycle stage. For any given area distribution, it was also found that the area distribution was virtually the same for the conventional two stage system as for the FR two stage system of the invention. Thus, at any given oxygen purity level, essentially the same area factor pertains for said two stage systems. For this reason, a plot of area factor vs. oxygen product purity was not included herein. The fact that the area factor is the same for the two systems is significant, however, in that it shows that there is no area factor penalty associated with the use of the FR two stage system of the invention vis-a-vis a conventional two stage recycle system. As indicated above with respect to the FIG. 2 plot, however, the FR system can produce a higher maximum oxygen concentration in the desired product.

As shown in FIG. 2, the same oxygen concentration can be obtained at a lower stage cut or a higher stage cut if a sufficient portion of the total surface area is allocated to the second stage membrane. Since the area factor follows the concentration, i.e. decreases with increasing oxygen concentration in the same manner for each two stage system, there is no advantage for either the conventional two stage recycle system or the FR two stage system of the invention on the basis of area factor alone.

Figure 3:
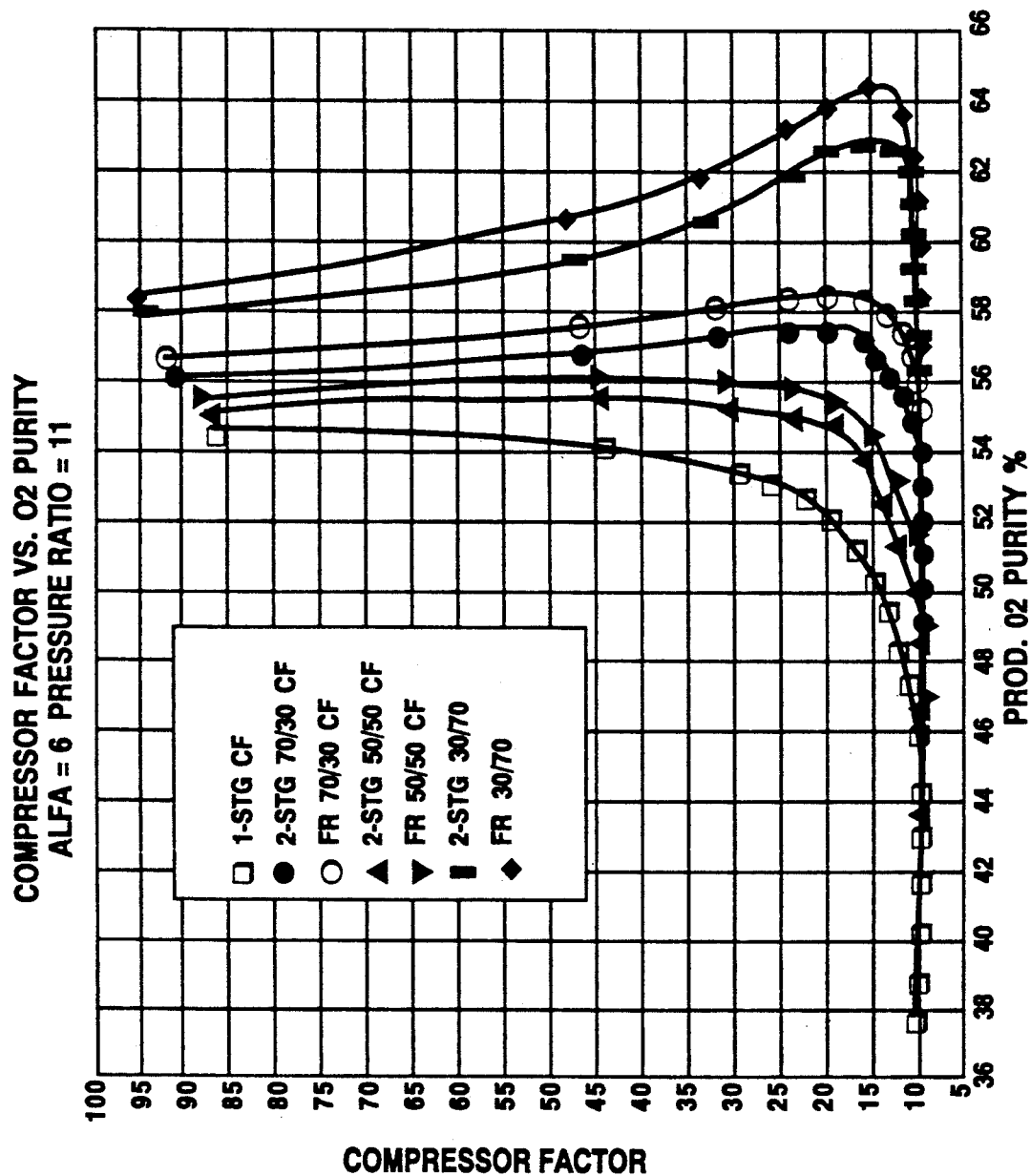
FIG. 3 is a plot of compressor factor plotted against product oxygen purity for single stage and various two stage systems.

FIG. 3 illustrates compressor factor plotted against product oxygen purity at the same separation factor and pressure ratio conditions indicated above for a single stage system, for grouped pairs at 70% first stage/30% second stage; 50% first stage/50% second stage; and 30% first stage/70% second stage for the conventional two stage recycle system and the FR two stage system of the invention as described above. It will be appreciated from this plot that, other than at oxygen purities below about 46%, the single stage system has a higher compressor factor than the two stage systems. Furthermore, at oxygen purities above about 50%, the FR two stage system of the invention exhibits a lower compressor factor than the conventional two stage system, or achieves a higher level of oxygen purity at a given compression factor. Thus, the system and process of the invention enables a desired oxygen purity level to be achieved at lower power requirements than the conventional two stage system.

In the membrane art, increased product purity and recovery are commonly obtained through the use of a greater amount of membrane surface area. While the surface area requirements of two stage systems are greater than for a single stage system, it was shown above that the FR two stage system of the invention does not have associated therewith an area disadvantage as compared to the conventional two stage recycle system. Nevertheless, the system of the invention is able to achieve a given purity level at desirably lower power requirements than the conventional two stage system.

It will be appreciated therefore, that the two stage systems are superior to the single stage system for all but the lowest product oxygen concentrations, i.e. below about 46% oxygen purity. In addition, the FR two stage system of the invention is able to produce higher product oxygen concentrations than those produced by the conventional two stage recycle system, at the same stage cut when both systems have the same surface area allocations to the two stages. Furthermore, the FR two stage system of the invention exhibits lower power requirements than the conventional two stage recycle system for a similar product oxygen concentration. Such lower compression factor, coupled with equivalent surface area requirements, corresponds to a desirably lower overall cost, and demonstrates that the system of the invention is more energy efficient than the conventional two stage recycle system.

It will be appreciated that various changes can be made in the details of the invention as described herein without departing from the scope of the appended claims. Thus, the system and process of the invention can be used to produce oxygen or oxygen-enriched air product from feed air at concentrations of from about 40% oxygen purity by volume up to about 90%, preferably from about 60% to about 85%. While the surface area distribution between the stages is generally preferred to be within the range indicated above, i.e. from about 70% to about 30% in the first stage, it will be understood that surface area distributions outside this range can also be employed, with the first stage/second stage area distribution ranging from about 10%/90% to about 90%/10%. It is generally preferred that the first stage membrane surface area be from about 25% to about 50% of the total membrane surface area of the system.

As indicated above, the highest oxygen concentrations in the permeate are obtained when the stage cut is low. Accordingly, it is within the scope of the invention to employ an overall stage cut for the FR two stage system of the invention of from about 0.5% to about 30%, preferably from about 5% to about 25%, depending on the overall performance requirements of a given application.

The invention can be practiced using any membrane composition and configuration suitable for achieving the desired selective permeation of oxygen from feed air. Thus, the membrane may be in the well known asymmetric, composite or isotropic membrane form, with ethyl cellulose, cellulose acetate, and polysulfone being illustrative examples of suitable membrane materials. While hollow fiber membranes are preferred, the membranes may be in other forms, such as flat sheets, if so desired. When hollow fiber membranes are employed, such hollow fibers are desirably arranged in a helical configuration.

The feed and permeate pressure levels employed in the practice of the invention can vary over a wide range depending on the requirements of a given application. The feed/permeate pressure ratio will typically range from about 2/1 to about 20/1, preferably from about 3/1 to about 12/1.

While the passage of all of the feed air to the permeate side of the second stage membrane is desirable in various embodiments of the invention, and obviates the need for blending separate gas streams outside the permeators, it is within the scope of the invention, as indicated above, to pass a portion of the feed air to said second stage membrane, and to pass the remaining feed air directly to the first stage feed compressor.

Thus, the amount of feed air passed to the permeate side of the second stage membrane can range from about 10% to nearly all or 100% of the total feed air to the system, with said amount preferably being from about 50% to nearly all or 100%, depending on the overall system employed and the desired performance requirements thereof.

I claim:

1. An improved membrane process for the production of oxygen from air comprising:
   (a) introducing all or a portion of feed air to a discharge end of a second stage of a two stage membrane system as purge gas on a permeate side thereof;
   (b) passing purge gas and permeate gas removed from the permeate side of said second stage to a feed end of the first stage of the two stage membrane system as feed gas therefor;
   (c) passing said feed gas through the first stage of the membrane system on a feed side thereof;
   (d) recovering oxygen product gas from a permeate side of said first stage;
   (e) introducing retentate gas from the first stage to the second stage of the membrane system for passage therethrough in a countercurrent flow pattern with respect to the flow of purge gas and permeate gas on the permeate side of said second stage, the flow ratio of the first stage permeate flow to the feed air flow to the membrane system being in the range of from about 0.5 to about 30%; and
   (f) discharging retentate gas from the permeate side of the second stage at a discharge end thereof; whereby the use of feed air as purge gas for the second stage of the membrane system increases the amount of oxygen permeating the second stage, thereby enhancing the oxygen enrichment of the feed to the first stage and the energy efficiency of the overall air separation process.

2. The process of claim 1 in which all of the feed air is passed to the second stage of the membrane system.

3. The process of claim 1 in which from 10% to nearly all of the feed air is passed to the second stage of the membrane system.

4. The process of claim 3 in which the portion of the feed air not passed to said second stage of the membrane system is passed to the feed end of the first stage as feed gas therefor.

5. The process of claim 1 in which from about 50% to nearly all of the feed air is passed to the second stage of the membrane system.

6. The process of claim 1 in which the flow ratio of the first stage permeate flow to the feed air flow to the membrane system is from about 5% to about 25%.

7. The process of claim 1 in which from about 10% to about 90% of the total membrane surface area of the system is in the first stage.

8. The process of claim 7 in which from about 30% to 70% of the total membrane surface area of the system is in the first stage.

9. The process of claim 7 in which at least half of the total membrane surface area of the system is in the second stage.

10. The process of claim 9 in which from 50% to 100% of the feed air is passed to the second stage of the membrane system.

11. The process of claim 10 in which the flow ratio is from about 5% to about 25%.

12. An improved membrane system for the production of oxygen from air comprising:
    (a) a two stage membrane system capable of selectively permeating oxygen from air;
    (b) conduit means for introducing feed air to the first stage of the membrane system at a desired feed pressure;
    (c) conduit means for recovering oxygen from a permeate side of said first stage as product gas;
    (d) conduit means for passing retentate gas from the first stage to the second stage of the membrane system;
    (e) conduit means for discharging retentate gas from a discharge end of the second stage of the membrane system;
    (f) conduit means for passing all or a portion of the feed air to the membrane system to the discharge end of the second stage for passage as purge gas on the permeate side of said second stage in countercurrent flow to the passage of retentate gas therethrough;
    (g) conduit means for passing purge and permeate gas from the permeate side of the second stage to a feed end of the first stage as feed air therefor, whereby the use of feed air as purge gas for the second stage of the membrane system increases the amount of oxygen permeating the second stage, thereby enhancing the oxygen enrichment of the feed to the first stage and the energy efficiency of the overall system.

13. The membrane system of claim 12 in which the conduit means for feed air is adapted to pass from about 10% to nearly all of the feed air to said second stage of the membrane system.

14. The membrane system of claim 13 in which the conduit means for feed air is adapted to pass all of the feed air to said second stage.

15. The membrane of claim 13 and including conduit means for passing the portion of the feed air not passed to said second stage to the feed end of the first stage as feed air therefor.

16. The membrane system of claim 12 in which the membrane surface area of the first stage of the membrane system is from about 10% to about 90% of the total membrane surface area of the system.

17. The membrane system of claim 16 in which the first stage membrane surface area is from about 30% to about 70% of the total membrane surface area of the system.

18. The membrane system of claim 16 in which the first stage membrane surface area is from about 25% to about 50% of the total membrane surface area of the system.

* * * * *